June 3, 1930.　　　J. J. GROETKEN　　　1,761,885
LIQUID DISPENSING APPARATUS
Filed April 24, 1926　　　4 Sheets-Sheet 3
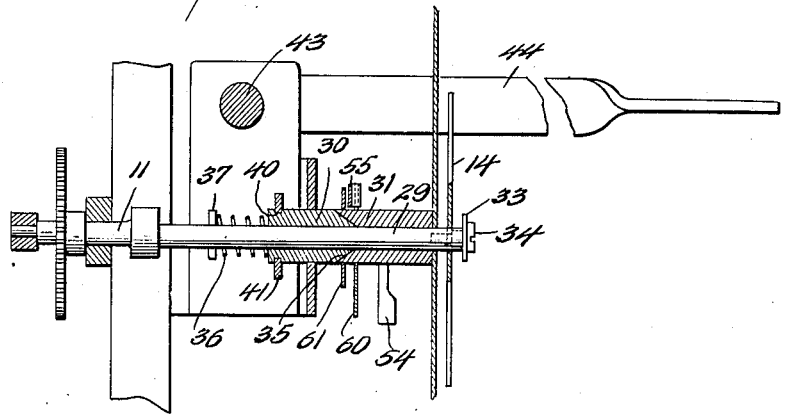
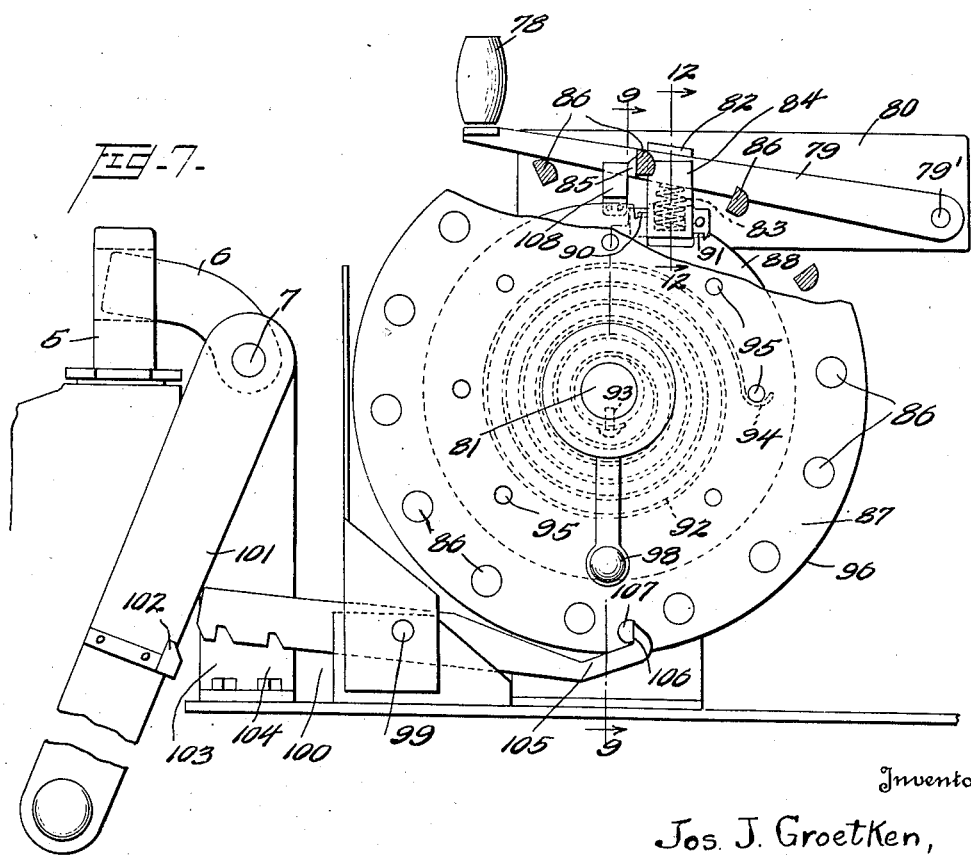
Inventor
Jos. J. Groetken,
By Arnd Shoemaker
Attorney June 3, 1930.  J. J. GROETKEN  1,761,885
LIQUID DISPENSING APPARATUS
Filed April 24, 1926   4 Sheets-Sheet 4
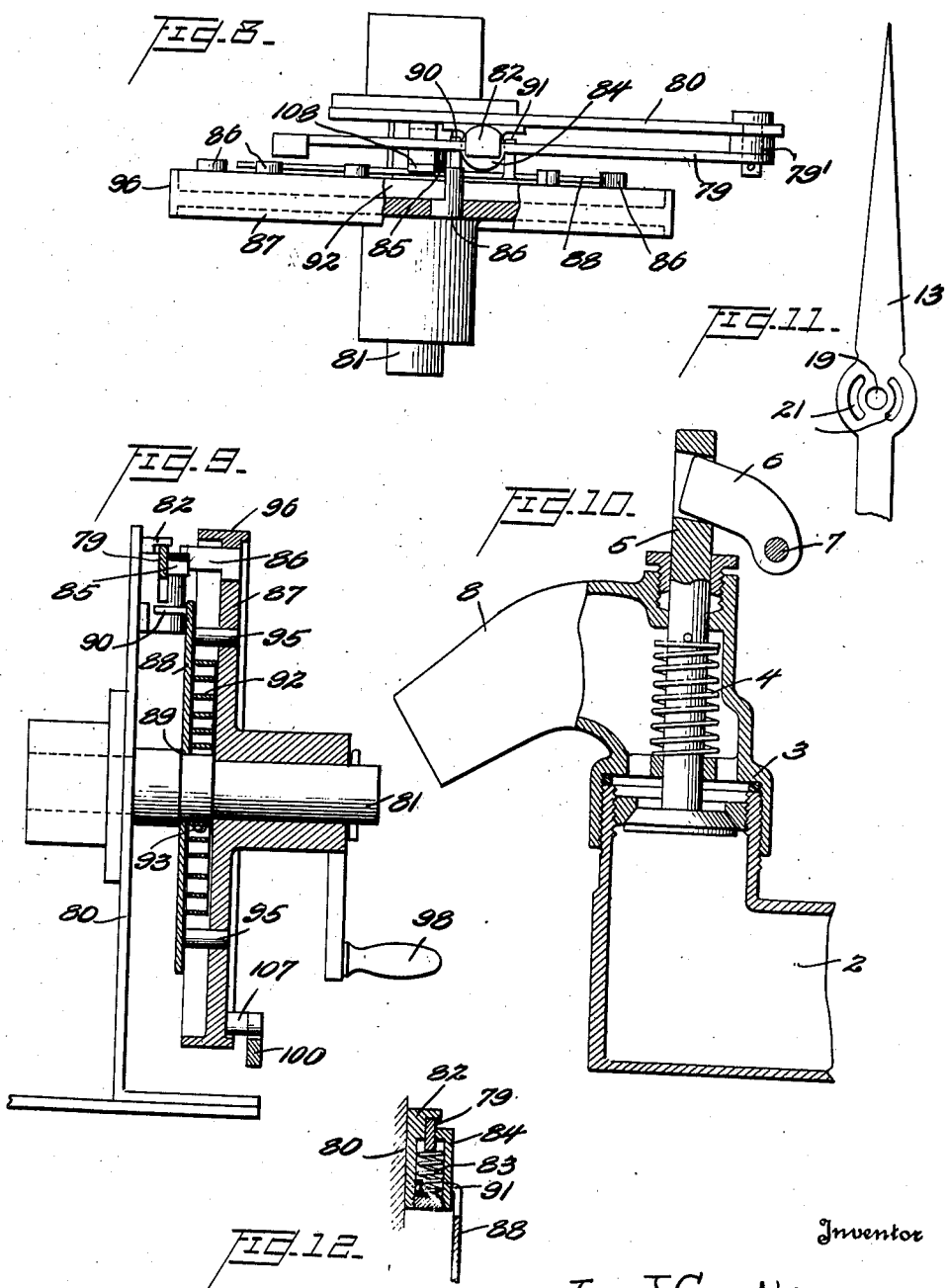

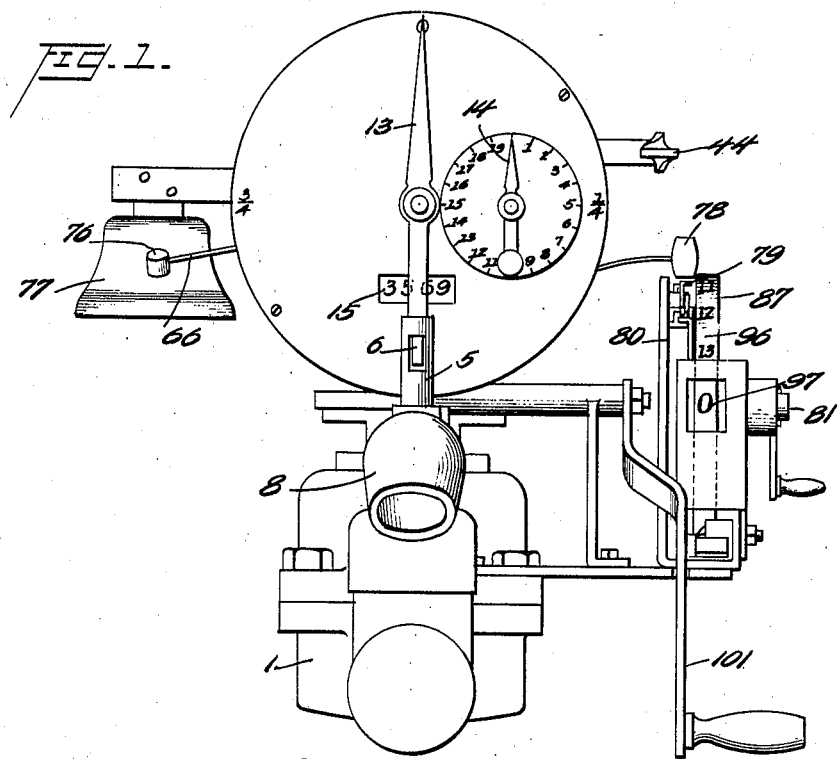

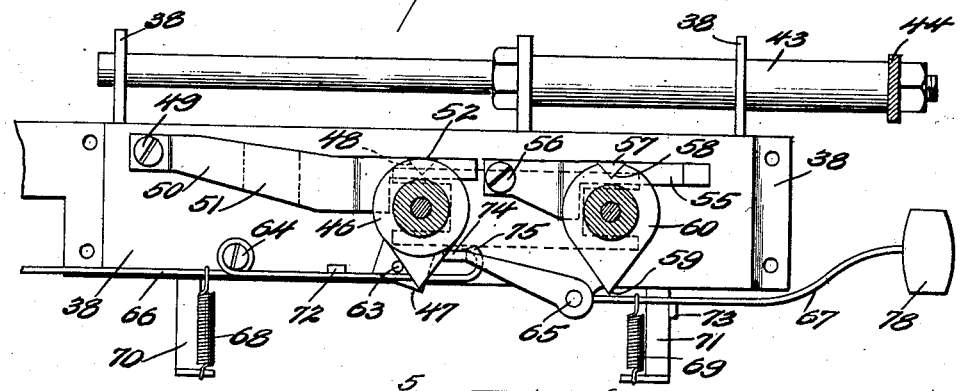

Patented June 3, 1930

1,761,885

UNITED STATES PATENT OFFICE

JOSEPH J. GROETKEN, OF AURORA, ILLINOIS

LIQUID-DISPENSING APPARATUS

Application filed April 24, 1926. Serial No. 104,463.

This invention relates to liquid dispensing apparatus and more particularly to apparatus for dispensing gasoline.

One object is to provide a dispensing apparatus employing a meter as one of its elements, the meter delivering direct to a dispensing valve. Another object is to provide dial pointers on the meter which can readily be moved back to zero after each lot of gasoline is dispensed. A further object is to provide quantity setting means which can be set for the number of gallons desired and which, when the set number of gallons has been measured by the meter, returns to zero position and automatically closes the dispensing valve. A still further object is to provide means for setting the dispensing valve in either wholly or partly open position to provide either a full or restricted flow of gasoline.

Other objects and advantages of the invention will hereinafter appear in the following description and the novel features thereof will be particularly pointed out in the appended claims.

Like letters of reference indicate like parts throughout the several figures of the drawings, in which Figure 1 is a front elevation of the apparatus;

Figure 2 is a plan view of Figure 1;

Figure 3 is a section on line 3—3 of Figure 4;

Figure 4 is an enlarged showing of a portion of Figure 2;

Figure 5 is a section of a portion of the apparatus on line 5—5 of Figure 4;

Figure 6 is a section on line 6—6 of Figure 4;

Figure 7 is an enlarged right hand side elevation of a portion of the apparatus;

Figure 8 is an enlarged plan view of a portion of the setting mechanism;

Figure 9 is a section on line 9—9 of Figure 7;

Figure 10 is a section of the dispensing valve on line 10—10 of Figure 2;

Figure 11 is a front elevation of an adjustable pointer; and

Figure 12 is a section of a portion of the setting pawl mechanism on line 12—12 of Figure 7.

It will be understood that the invention may be varied in its details of construction and that the specific embodiment illustrated and described herein is only indicative thereof.

Quantity measuring means in the form of a meter 1 (Fig. 1) is connected by pipe 2 (Fig. 10) to a dispensing valve 3. This dispensing valve 3 is normally held closed by spring 4 as shown, but when stem 5 is forced down by arm 6 carried by rock shaft 7, the valve is opened to permit flow of liquid out of nipple 8.

Extending up from meter 1 is a shaft 9 (Figs. 2, 5) which through suitable gearing actuates shafts 10, 11, 12 (Figs. 4, 5) respectively carrying indicating pointers 13, 14 and total index 15.

The outer portion of shaft 10 carries pointer 13 for indicating gallons and fractions thereof, while pointer 14 on the outer portion of shaft 11 indicates up to a number of gallons.

The outer portion of shaft 10 comprises a shaft member 16 and two hub members 17, 18. Hub member 18 is freely rotatable on shaft member 16 and carries pointer 13 with a central hole 19 (Fig. 11) freely fitting over shaft member 16, the pointer being secured to hub member 18 by screws 20. To permit the pointer to be adjusted so it will properly point to zero, screws 20 preferably pass through slots 21 (Fig. 11). Screw 22 secured in end of shaft member 16 holds cover 23, spring 24 and thrust washer 25 in position. The hub members 17, 18 have opposed friction cone clutch faces 26. Member 17 is slidable longitudinally thereon in any desired manner. Member 17 is normally forced into clutching engagement with member 18 by a relatively strong spring 27 engaged against pin 28. Spring 24 is relatively weak and is therefore compressed by strong spring 27 until the central area of pointer 31 thrusts against cover 23. The function of spring 24 will be hereinafter pointed out.

The outer portion of shaft 11 comprises a shaft member 29 and two hub members 30, 31. Hub member 31 is freely rotatable on shaft member 29 and carrier pointer 14 fixed thereto by screws 32. Heads of screws 32 engage against thrust washer 33 held in place by screw 34 secured in end of shaft member 29. Hub member 30 is slidable longitudinally of shaft member 29 and may be secured non-rotatably thereon in any desired manner. Member 30 is normally forced into clutching engagement with member 31 by spring 36 engaged against pin 37. Hub members 17, 30 are rotatably supported in frame 38 and have annular slots 39, 40 engaged by double end clutch release fork 41, which latter is engaged by arm 42 secured on rock shaft 43 carrying operating lever or handle 44, for which purpose the release fork 41 is provided with an extension (shown in dotted lines in Figure 5) into an aperture of which the end of arm 42 projects.

The lower end of pointer 13 carries counterweight 45 which, when the hubs 17, 18 are unclutched causes the pointer to swing to upright zero position. At such times as the pointer points in a downward vertical or near vertical position, the counterweight 45 will sometimes have insufficient effect to promptly swing the pointer to zero when hubs 17, 18 are unclutched. This difficulty is overcome by additional mechanism as will now be described. A cam 46 is secured to hub 18 and has a V-shaped portion 47 pointed oppositely to the point of pointer 13. Opposite V-shaped portion 47 is a V-shaped notch 48. Pivoted at 49 on frame 38 is a lever 50 weighted at 51 and having a hardened V-shaped block 52 adapted to fit notch 48. Disc 53 on the hub 18 guides lever 50 in proper position on cam 46. When pointer 13 points downwardly V-point 47 of the cam 46 points upward, and V-point of block 52 pressing on one side or the other of V-portion of cam 46 starts pointer swinging toward zero, the remaining movement of pointer toward zero being accomplished by counterweight 45. When the pointer arrives near zero, V-block 52 of weighted lever 50 enters notch 48 and stops the pointer at exactly zero.

Pointer 14 is normally swung to zero by counterweight 54 secured to hub 31. Lever 55 pivoted at 56 and having V-shaped block 57 coacts with V-shaped notch 58 and V-shaped portion 59 on cam 60 to swing and stop pointer 14 at zero in a way similar to the way pointer 13 is swung and stopped by corresponding parts previously described. Guide disc 61 aids in keeping lever 55 in proper position on cam 60.

Secured to hub member 18 is an arm 62 having pin 63. Pivoted to frame 38 at 64, 65, are levers or arms 66, 67 having their outer ends normally held down by springs 68, 69 secured to depending portions 70, 71 of frame 38. The movement of levers 66, 67 is limited by abutments 72, 73. The inner ends of levers 66, 67 have cam portions 74, 75. Pin 63 moves clockwise and once each revolution of pointer 13 presses cam portions 74, 75 down against action of springs 68, 69. As pin 63 passes out of contact with cam ends 74, 75 springs 68, 69 pull outer ends of levers 66, 67 down until they strike abutments 72, 73. In its downward movement hammer 76 on lever 66 strikes bell 77 carried on frame 38. Similarly, hammer 78 on lever 67 strikes lever 79, lever 67 being resilient and hammer 78 being in such position that it strikes lever 79 by springing downward, lever 67 then springing upward to carry and retain hammer 78 out of contact with lever 79.

When hub members 17, 18, 30, 31 are unclutched by pressing downward on lever 44, springs 27, 36 are considerably shortened by the backward movement of hubs 17, 30. When this happens, spring 24 moves hub 18 back until pin 63 clears the path of cam portions 74, 75. Thus as pointers 13 and 14 return to zero as previously described, cam portions 74, 75 do not interfere with the proper return of pointer 13.

Secured to frame portion 80 is a stud shaft 81. Pivoted at 79′ is lever 79, which is normally pressed upward against abutment 82 by spring 83 mounted in barrel 84 secured on frame portion 80. Lever 79 has setting pawl 85 adapted to normally engage one of a plurality of ratchet studs 86 on setting wheel 87 journalled on stud shaft 81. Finger 108 is secured to frame portion 80 to act as a backing for pawl 85. A guide plate 88 abuts against shoulder 89 on stud shaft 81 and has fingers 90, 91, one on each side of barrel 84 to prevent plate 88 from turning on shaft 81. Between plate 88 and wheel 87 is a coil spring 92 having one end secured to shaft 81 at 93 and the other end bent at 94 to engage any one of a plurality of pins 95.

Setting wheel 87 carries numerals on its edge 96 visible at zero position 97 (Fig. 1) when in use. By turning wheel 87 clockwise (Fig. 1) by means of handle 98 the ratchet studs 86 depress pawl lever 79 as they ride over pawl 85, the lever 79 promptly rising to position again by action of spring 83. If wheel 87 is turned to produce more than a certain tension on spring 92 the end 94 slips from one to another of pins 95, thereby relieving any excess tension on the spring.

Pivoted at 99 is a set and release pawl 100. Secured on shaft 7 is an operating lever 101 having a tooth 102 adapted to engage either of notches 103, 104 on pawl 100. The other end of pawl 100 has a cam face 105 and a locking face 106. When tooth 102 is engaged in notch 104 the valve will be fully open and will give a maximum rate of flow of liquid. Wheel 87 has a pin 107 which, when the setting wheel returns to zero as will be later described, first strikes cam face 105 to release lever 101 thereby closing the dispensing valve, then engages face 106 to stop the setting wheel to indicate zero.

Operation. By means of pressing down lever 44 both pointers will be made to stand at zero as previously described. By handle 98 setting wheel 87 is turned clockwise until the desired number of gallons is indicated at 97 (Fig. 1). Lever 101 is then forced inward by hand until tooth 102 engages notch 103 for a restricted flow, or notch 104 for a full flow of liquid. This positioning of the lever 101 opens the dispensing valve against action of spring 4. Liquid then passes through meter 1 by means of either power, hand, or air operation as described. As the liquid passes through the meter 1, pipe 2 and dispensing valve 3, by means of shaft 9 and other mechanism previously described, the pointers 13, 14 move to indicate the amount of liquid passing through the meter. As each gallon is dispensed, hammer 76 rings bell 77 and hammer 78 strikes lever 79, releasing pawl 85 from engagement with a stud 86. As hammer 78 immediately springs up away from lever 79, spring 83 quickly positions pawl 85 to engage the next stud 86. Thus if the setting wheel were originally set to dispense five gallons, numeral five would show at 97 (Fig. 1). But when the first gallon was dispensed, the hand 13 had made one complete revolution back to zero, hand 14 indicated one gallon and the setting wheel had moved so that numeral 4 replaced numeral 5. This action of hand 13 is repeated until hand 14 indicates five gallons and zero appears on the setting wheel at 97. As zero appears at 97, pin 107 depresses cam face 105 and raises notch 103 (or 104) out of engagement with the tooth 102, whereupon spring 4 closes the dispensing valve 3 and swings lever 101 to position shown in Fig. 7. It will be seen that valve opening lever 101 with tooth 102 will not engage with notch 103 or 104 until setting wheel 87 has been set to some numeral.

Changes in the details of construction may be resorted to without departing from the spirit of the invention as defined by the appended claims.

Having described the invention, what is claimed is:

1. In a liquid dispensing apparatus, quantity measuring means, a shaft normally clutched therewith, an indicating pointer secured on the shaft, gravity actuated means secured to the shaft opposite the point of the indicating pointer, a cam secured to the shaft and having a V-shaped portion pointing oppositely to the point of the indicating pointer, and pressing means pressing on the V-shaped portion transversely of the shaft to aid in swinging the pointer from a certain range of position to zero.

2. The combination of claim 1 in which the cam has a notch opposite its V-shaped point adapted to be engaged by the pressing means to properly locate the indicating pointer at zero.

3. The combination of claim 1 in which the cam has a V-shaped notch opposite its V-shaped point adapted to be engaged by a similar shaped part on the pressing means to properly locate the indicating pointer at zero.

4. The combination of claim 1 in which the cam has a notch opposite its V-shaped point adapted to be engaged by the pressing means to properly locate the indicating pointer at zero, and means for adjustably securing the indicating pointer to the shaft.

5. In a liquid dispensing apparatus, quantity measuring means having a shaft member, a pair of clutch members mounted to move longitudinally of the shaft member, a lever adjacent one clutch member, an arm on the one clutch member adapted during rotation of the one clutch member to engage the lever while the clutch members are interengaged, means for moving the other clutch member, and means for moving the one clutch member axially on the shaft while the clutch members are disengaged to move the arm out of possible engagement with the lever during the rotation of the one clutch member.

6. The combination of claim 5 in which the means for moving the one clutch member axially normally yieldably tends to produce such movement.

7. The combination of claim 5 in which means normally yieldably holds the clutch members interengaged.

8. In a liquid dispensing apparatus, quantity setting means having an arm, a dispensing valve normally held closed by yielding means, a valve lever for forcing the valve open and setting it in open position, trip means intermediate the wheel and lever, one end of the trip means having means for engaging the lever, and the other end having a cam face adapted to be engaged by the arm of the setting means to release the other end of the trip means from engagement with the lever.

9. The combination of claim 8 in which the trip means is a pivoted member.

10. The combination of claim 8 in which the trip means has an abutment adjacent the cam face to stop the arm with the setting means in zero position.

11. In a liquid dispensing apparatus, a meter, a valve in the meter line adapted to be closed when a predetermined quantity of liquid has passed through said meter, a quantity setting mechanism adapted to be actuated while the liquid is passing through the meter, means independent of the meter for actuating the setting mechanism, said setting mechanism causing the closing of said valve at a predetermined position of said setting mechanism, and means operable by the meter to cause the actuation of said setting mechanism.

12. In a liquid dispensing apparatus embodying a meter and a valve in the meter line adapted to be closed when a predetermined quantity of liquid has passed through said meter, a quantity setting mechanism comprising a wheel under spring tension, an escapement for holding said wheel, means actuated by the meter for operating the escapement, and means released by the setting mechanism for closing the valve.

13. In a liquid dispensing apparatus, a meter, a valve in the meter line adapted to close when a predetermined amount of liquid has passed through the meter, a quantity setting mechanism comprising an individual power means for actuating it, means actuated by the meter for causing the power means of the quantity setting mechanism to act, and means associated with the quantity setting mechanism for causing the valve to close.

14. In a liquid dispensing apparatus embodying a meter and a discharge valve adapted to be closed after a predetermined quantity of liquid has been discharged, a setting mechanism comprising a wheel provided with a peripheral dial, the indicia on which is adapted to be exposed to view, spring means for advancing the wheel, means for permitting the advance of the wheel step by step during the operation of the meter, and connections between the wheel and valve to accomplish the closing of the valve when the wheel assumes a predetermined position.

15. In a liquid dispensing apparatus, a meter, a pair of stub shafts, pointers rotating with said shafts, dials associated with said pointers, means for releasing the pointers from the shafts whereby they may assume a predetermined position with respect to said dials, a quantity setting mechanism, means released from one of said shafts for advancing the setting mechanism step by step, a valve for stopping the flow of liquid through said meter, and means controlled by said setting mechanism for causing said valve to close when the setting mechanism has advanced to a predetermined position.

16. In a liquid dispensing apparatus, a meter, a valve in the meter line, a quantity setting mechanism controlling said valve, means for advancing said setting mechanism, step by step, and means for actuating said advancing means, the meter operating upon said actuating means to store power therein and release the same for its actuation of said advancing means.

In testimony whereof I affix my signature.

JOSEPH J. GROETKEN.